(12) United States Patent
Jeong

(10) Patent No.: US 10,459,295 B2
(45) Date of Patent: Oct. 29, 2019

(54) STRETCHED DISPLAY PANEL AND MANUFACTURING METHOD THEREFOR

(71) Applicant: TOVIS CO., LTD., Incheon (KR)

(72) Inventor: Young Tae Jeong, Seoul (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 16/082,940

(22) PCT Filed: Feb. 17, 2017

(86) PCT No.: PCT/KR2017/001767
§ 371 (c)(1),
(2) Date: Sep. 7, 2018

(87) PCT Pub. No.: WO2017/155222
PCT Pub. Date: Sep. 14, 2017

(65) Prior Publication Data
US 2019/0033637 A1  Jan. 31, 2019

(30) Foreign Application Priority Data
Mar. 8, 2016 (KR) .................. 10-2016-0027895

(51) Int. Cl.
*G02F 1/1339* (2006.01)
*G02F 1/1335* (2006.01)
*G02F 1/1362* (2006.01)

(52) U.S. Cl.
CPC .......... *G02F 1/1339* (2013.01); *G02F 1/1362* (2013.01); *G02F 1/133516* (2013.01); *G02F 2001/136222* (2013.01)

(58) Field of Classification Search
CPC ............... G02F 1/1339; G02F 1/1362; G02F 1/133516; G02F 2001/136222; G02F 1/133351; G02F 1/133305; G02F 1/1333
See application file for complete search history.

(56) References Cited

U.S. PATENT DOCUMENTS

| | | | |
|---|---|---|---|
| 6,407,360 B1 * | 6/2002 | Choo | B23K 26/046 |
| | | | 219/121.67 |
| 2011/0309380 A1 * | 12/2011 | Liu | G02F 1/136204 |
| | | | 257/88 |

(Continued)

FOREIGN PATENT DOCUMENTS

| KR | 10-0671215 B1 | 1/2007 |
|---|---|---|
| KR | 10-0718256 B1 | 5/2007 |

(Continued)

OTHER PUBLICATIONS

International Search Report for PCT/KR2017/001767 dated May 23, 2017 from Korean Intellectual Property Office.

*Primary Examiner* — Victor A Mandala
(74) *Attorney, Agent, or Firm* — Revolution IP, PLLC

(57) ABSTRACT

A method of manufacturing a stretched display panel, includes: cutting the TFT substrate to a desired size; cutting the color filter substrate so as to have a length smaller than a length of the TFT substrate such that a pixel exposure portion, from which one or more horizontal pixel lines are exposed, is formed at the TFT substrate; forming a short-circuit prevention seal for covering one of the horizontal pixel lines that is adjacent to an end of the color filter substrate in order to prevent occurrence of a short circuit due to introduction of foreign matter; and forming an cutoff line for cutting off the horizontal pixel line(s) that is not covered by the short-circuit prevention seal and the horizontal pixel line that is covered by the short-circuit prevention seal from each other.

11 Claims, 4 Drawing Sheets

(56) References Cited

U.S. PATENT DOCUMENTS

| | | |
|---|---|---|
| 2012/0083180 A1 | 4/2012 | Kim et al. |
| 2016/0170247 A1* | 6/2016 | Hassan ................. G02F 1/1339 349/42 |
| 2019/0235337 A1* | 8/2019 | McCartney ....... G02F 1/136286 |

FOREIGN PATENT DOCUMENTS

| | | |
|---|---|---|
| KR | 10-0963496 B1 | 6/2010 |
| KR | 10-2011-0099477 A | 9/2011 |
| KR | 10-2013-0024097 A | 3/2013 |
| KR | 10-2013-0142048 A | 12/2013 |

* cited by examiner

[FIG.1]
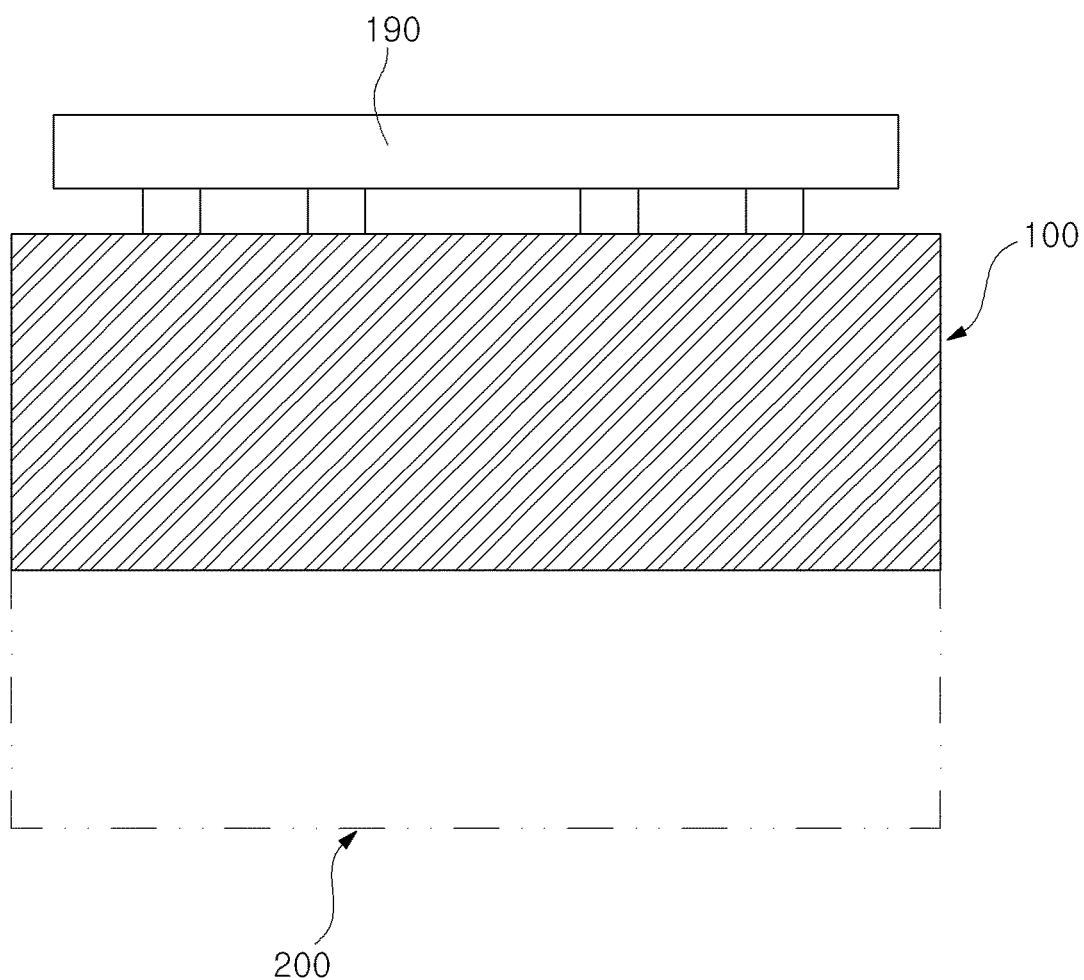

[FIG.2]
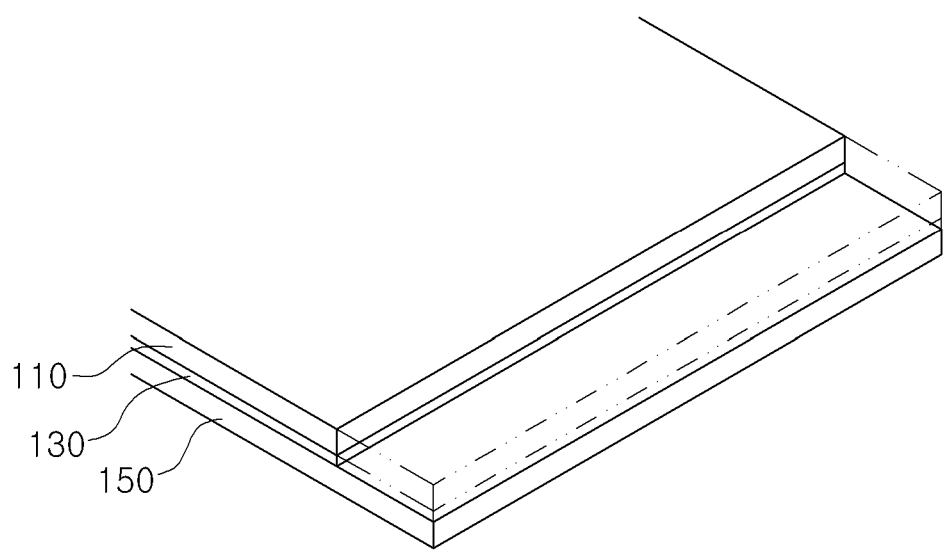
[FIG.3]
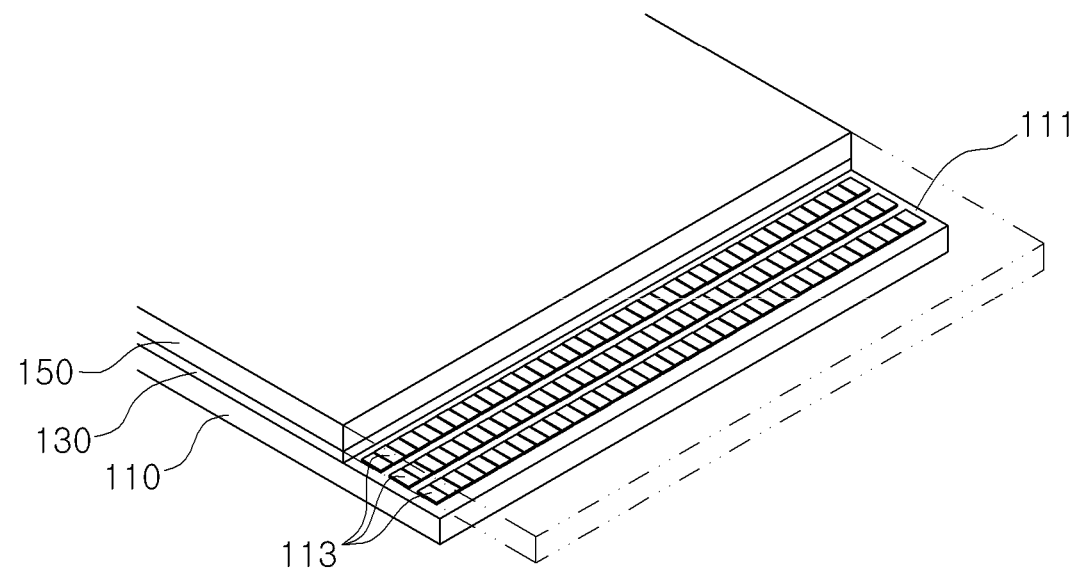

[FIG.4]
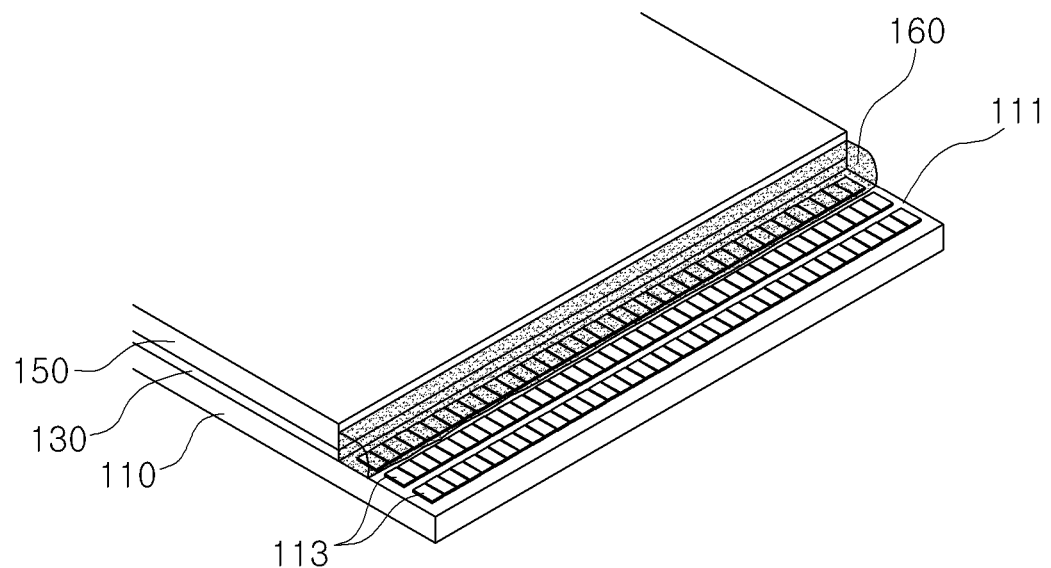
[FIG.5]
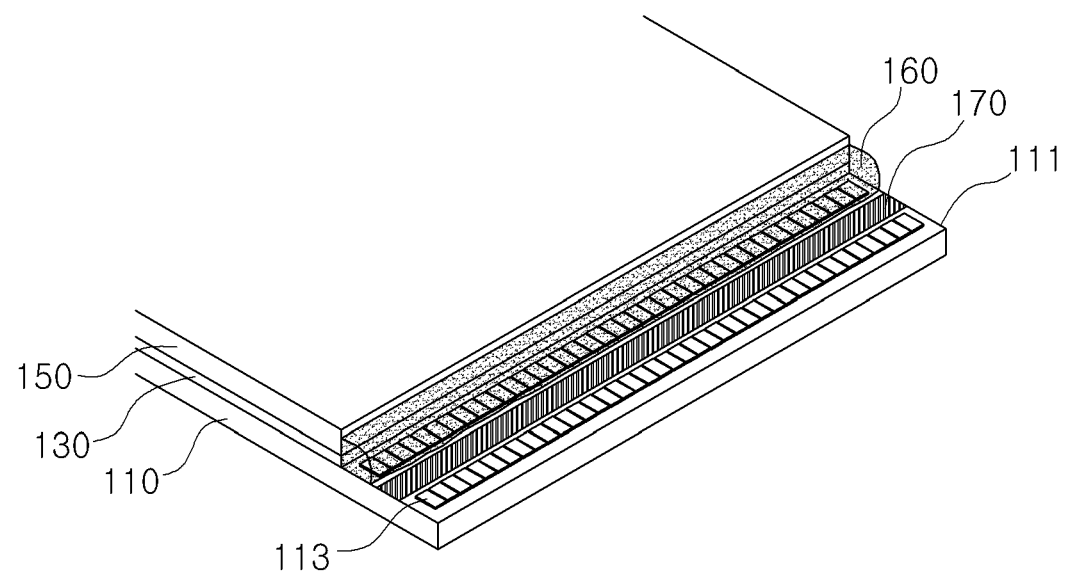

[FIG.6]
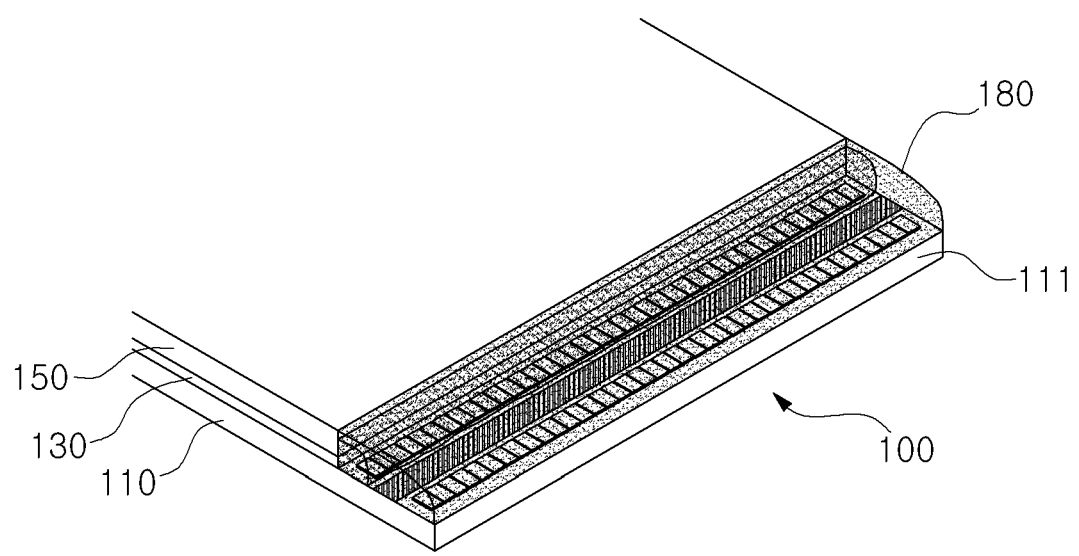
[FIG.7]
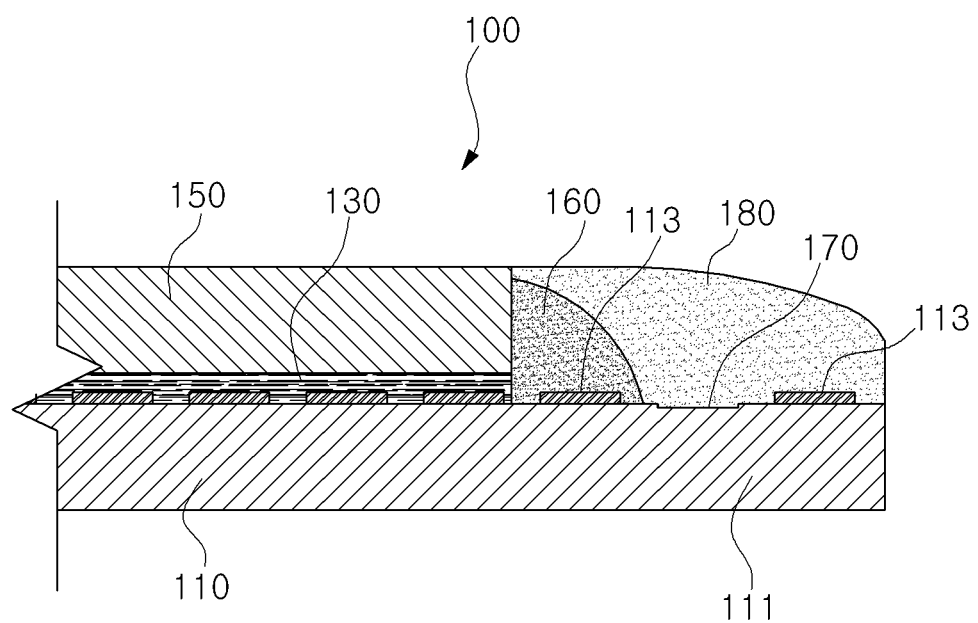

STRETCHED DISPLAY PANEL AND MANUFACTURING METHOD THEREFOR

TECHNICAL FIELD

The present invention relates to a stretched display panel manufactured by cutting a ready-made display panel for displaying an image and a method of manufacturing the same.

BACKGROUND ART

In general, a display panel, which is a device for displaying an image, includes a thin film transistor (TFT) substrate, a color filter substrate, and a liquid crystal layer disposed therebetween.

In the display panel configured as described above, the polymer liquid crystal layer blocks or transmits light emitted from the TFT substrate, and the light is colored through the color filter substrate, whereby an image is displayed.

Meanwhile, display panels are manufactured in standardized sizes. In the case in which a non-standardized display panel is to be used, therefore, a standardized display panel is cut.

A conventional method of cutting a display panel is disclosed in Korean Registered Patent No. 10-0671215 (published on Jan. 18, 2007) entitled FLAT DISPLAY PANEL AND METHOD OF CUTTING THE SAME.

The conventional flat display panel includes two fragile substrates bonded to each other using a seal excluding openings formed therein, the two fragile substrates and the seal defining a closed space. One of the two fragile substrates has a scribed surface, which constitutes the outer surface of the closed space. The scribed surface of one of the fragile substrates is opposite a non-scribed surface of the other fragile substrate, and a terminal unit is located at the scribed surface of one of the fragile substrates. In the conventional method of cutting the flat display panel, the scribed surface of one of the fragile substrates is cut first.

In the conventional flat display panel, the lower fragile substrate is cut with a margin in the direction in which the lower fragile substrate is bent. As a result, the upper and lower fragile substrates are cut so as to have the same length.

When the conventional flat display panel is cut, however, conductive foreign matter separated from circuits printed on the fragile substrates become attached to a circuit substrate, whereby noise is generated due to a short circuit, and thus the defect rate of the display panel is high.

In addition, it is difficult to restore display panels from which noise is generated, and all such display panels must therefore be discarded.

DISCLOSURE

Technical Problem

Therefore, the present invention has been made in view of the above problems, and it is an object of the present invention to provide a stretched display panel configured such that the amount of noise generated in the stretched display panel due to conductive foreign matter is minimized when a display panel is cut in order to manufacture the stretched display panel, whereby the defect rate of the stretched display panel is reduced, and such that an existing display panel from which noise is generated is capable of being restored, whereby the number of stretched display panels that are discarded is minimized, and a method of manufacturing the same.

Technical Solution

In accordance with an aspect of the present invention, the above and other objects can be accomplished by the provision of a method of manufacturing a stretched display panel by cutting a ready-made display panel including a color filter substrate and a thin film transistor (TFT) substrate to a desired size, the method including cutting the TFT substrate to a desired size, cutting the color filter substrate so as to have a length smaller than the length of the TFT substrate such that a pixel exposure portion, from which one or more horizontal pixel lines are exposed, is formed at the TFT substrate, forming a short-circuit prevention seal for covering one of the horizontal pixel lines that is adjacent to an end of the color filter substrate in order to prevent the occurrence of a short circuit due to the introduction of foreign matter, and forming an cutoff line for cutting off the horizontal pixel line(s) that is not covered by the short-circuit prevention seal and the horizontal pixel line that is covered by the short-circuit prevention seal from each other.

The method may further include forming a reinforcement seal for entirely covering the pixel exposure portion of the TFT substrate, from which the horizontal pixel lines are exposed, in order to increase the rigidity of the pixel exposure portion.

The step of forming the short-circuit prevention seal may include applying a hardenable resin so as to cover one of the horizontal pixel lines exposed from the pixel exposure portion that is adjacent to a cut end of the color filter substrate and performing hardening treatment in order to harden the hardenable resin.

The cutoff line may be formed through incineration using a laser.

The method may further include supplying electric power to the display panel in order to inspect whether noise is generated from the display panel (a preliminary inspection step), the preliminary inspection step being performed between the step of cutting the color filter substrate so as to have a length smaller than the length of the TFT substrate and the step of forming the short-circuit prevention seal.

The method may further include supplying electric power to the display panel in order to inspect whether noise is generated from the display panel (a final inspection step), the final inspection step being performed after the step of forming the cutoff line.

In accordance with another aspect of the present invention, there is provided a stretched display panel manufactured by cutting a ready-made display panel including a color filter substrate and a TFT substrate to a desired size, the stretched display panel including a pixel exposure portion extending from the TFT substrate so as to be longer than a cut end of the color filter substrate in order to expose one or more horizontal pixel lines, a short-circuit prevention seal for covering one of the horizontal pixel lines that is adjacent to the cut end of the color filter substrate, among the horizontal pixel lines exposed through the pixel exposure portion, in order to prevent the occurrence of a short circuit due to foreign matter, and an cutoff line for cutting off the horizontal pixel line(s) that is not covered by the short-circuit prevention seal and the horizontal pixel line that is covered by the short-circuit prevention seal from each other.

The stretched display panel may further include a reinforcement seal for entirely covering the pixel exposure portion of the TFT substrate, from which the horizontal pixel lines are exposed, in order to increase the rigidity of the pixel exposure portion.

The short-circuit prevention seal may be a hardenable resin configured to be hardened through hardening treatment.

The cutoff line may be formed through incineration using a laser.

Advantageous Effects

According to the present invention, it is possible to manufacture a stretched display panel in which the amount of noise is minimized due to conductive foreign matter by cutting a TFT substrate first, cutting a color filter substrate such that a pixel exposure portion is formed at the TFT substrate, and forming a short-circuit prevention seal and an cutoff line at the TFT substrate at the time of cutting a display panel.

In addition, an existing display panel from which noise is generated may be restored using a method according to the present invention, whereby it is possible to minimize the number of defective stretched display panels that are discarded.

DESCRIPTION OF DRAWINGS

FIG. 1 is a plan view showing a stretched display panel according to an embodiment of the present invention;

FIG. 2 is a perspective view illustrating a method of manufacturing a stretched display panel according to an embodiment of the present invention, showing the state in which a TFT substrate is cut;

FIG. 3 is a perspective view illustrating the method of manufacturing the stretched display panel according to the embodiment of the present invention, showing the state in which a color filter substrate is cut;

FIG. 4 is a perspective view illustrating the method of manufacturing the stretched display panel according to the embodiment of the present invention, showing the state in which a short-circuit prevention seal is formed;

FIG. 5 is a perspective view illustrating the method of manufacturing the stretched display panel according to the embodiment of the present invention, showing the state in which a cutting line is formed;

FIG. 6 is a perspective view illustrating the method of manufacturing the stretched display panel according to the embodiment of the present invention, showing the state in which an cutoff line is formed; and FIG. 7 is a side sectional view showing a cut portion of the stretched display panel according to the embodiment of the present invention.

DESCRIPTION OF REFERENCE NUMERALS

100: Stretched display panel 119: TFT substrate
111: Pixel exposure portion 113: Horizontal pixel lines
130: Polymer liquid crystal layer 150: Color filter substrate
160: Short-circuit prevention seal 170: Cutoff line
180: Reinforcement seal 190: Drive circuit substrate
200: Ready-made display panel

BEST MODE

Hereinafter, embodiments of the present invention will be described with reference to the accompanying drawings.

A stretched display panel 100 according to the present invention may be a display panel 200 that is manufactured by cutting a ready-made display panel 200 into a desired shape, or may be a stretched display panel that is manufactured in advance and has defects.

As shown in FIG. 1, the portion of a ready-made display panel 200 that is opposite the portion of the ready-made display panel to which a drive circuit is attached is cut in the horizontal direction. Only the portion of the ready-made display panel to which a tab of a drive circuit substrate 190 is attached is used as a stretched display panel 100, and the remaining portion of the ready-made display panel is discarded without being used.

The stretched display panel 100, which is manufactured by cutting the ready-made display panel in the horizontal direction, as described above, has, for example, an aspect ratio of 2 or more:1, rather than a general aspect ratio of 16:9, 16:10, or 4:3. For this reason, the display panel manufactured as described above is called a stretched display panel 100.

Here, the display panel 200, from which the stretched display panel 100 is manufactured, may be a liquid crystal display (LCD).

First, a method of manufacturing a stretched display panel 100 according to an embodiment of the present invention will be described.

As shown in FIG. 1, the stretched display panel 100 according to the embodiment of the present invention is manufactured by cutting only a thin film transistor (TFT) substrate 110 of a ready-made display panel 200 to a desired size.

At this time, the TFT substrate 110 may be cut using any of various cutting means, such as a diamond wheel, a laser, a water jet, or chemical etching.

When the TFT substrate 110 is cut, pixels or gate lines in the cut portion of the TFT substrate are damaged depending on the cutting means that is used. In this embodiment, therefore, the TFT substrate 110 is cut with a margin equivalent to about three horizontal pixel lines 113 in consideration of the pixels that are damaged. Alternatively, at least one horizontal pixel line 113 may be left.

Each of the horizontal pixel lines 113 is a line in which electrical pixels are arranged horizontally on the TFT substrate 110. Gate lines for electrically connecting the horizontal pixel lines 113 may be included.

As shown in FIG. 3, the display panel 200 is turned upside down after the TFT substrate 110 is cut, and then a color filter substrate 150 is cut.

Meanwhile, the color filter substrate 150 is cut so as to have a length smaller than the length of the TFT substrate 110 such that a pixel exposure portion 111, from which a plurality of horizontal pixel lines 113 is exposed, is formed at the TFT substrate 110.

In the same manner as when cutting the TFT substrate 110, the color filter substrate 150 may be cut using any of various cutting means, such as a diamond wheel, a laser, or chemical etching.

The three horizontal pixel lines 113, which are left in consideration of the pixels that are damaged when the TFT substrate 110 is cut, may be exposed from the TFT substrate 110.

Meanwhile, the pixel exposure portion 111 of the TFT substrate 110, from which the horizontal pixel lines 113 are exposed, may function to support the lower end of a short-circuit prevention seal 160, which will be described below.

In the case in which the color filter substrate 150 and the TFT substrate 110 are cut so as to have the same length, the short-circuit prevention seal 160, which is in a gel state, runs down when the short-circuit prevention seal 160 is disposed between the color filter substrate 150 and the TFT substrate 110. As a result, it is difficult to form the short-circuit prevention seal 160. Furthermore, it is necessary to use a gel-type short-circuit prevention seal 160 having high viscosity in order to easily fix the short-circuit prevention seal 160. In this case, however, the thickness of the short-circuit prevention seal 160 may be increased, and the amount of material that is used to form the short-circuit prevention seal 160 may be increased.

After the color filter substrate 150 is cut, the portion of a polymer liquid crystal layer 130 that is located above the pixel exposure portion 111 may be removed.

After the TFT substrate 110 and the color filter substrate 150 are cut, a preliminary inspection is carried out.

The preliminary inspection is carried out as follows. The drive circuit is powered on in order to temporarily drive the stretched display panel 100, and then whether noise is generated from the stretched display panel 100 is inspected.

When the color filter substrate 150 or the TFT substrate 110 is cut, foreign matter is generated therefrom. In particular, conductive foreign matter is generated from the TFT substrate 110 due to the characteristics of the TFT substrate 110. The generated conductive foreign matter is introduced into the exposed pixels, whereby a short circuit occurs. When the short-circuited display panel 200 is driven, noise is generated, whereby a horizontally striped pattern image is not displayed.

Meanwhile, in the case in which noise is generated when the preliminary inspection is carried out, the portion of the display panel from which the noise is generated may be inspected intensively in order to remove foreign matter. Alternatively, the pixel exposure portion 111, from which the horizontal pixel lines 113 are exposed, may be washed in order to remove foreign matter.

After the foreign matter is removed, the preliminary inspection is carried out again, and the stretched display panel 100 undergoes the next process only when the stretched display panel 100 passes the preliminary inspection.

As shown in FIG. 4, a short-circuit prevention seal 160 is formed at the stretched display panel 100, having passed the preliminary inspection, in order to protect the polymer liquid crystal layer 130 and, at the same time, to prevent foreign matter from being introduced into the pixel exposure portion 111, from which the horizontal pixel lines 113 are exposed.

Meanwhile, the short-circuit prevention seal 160 may be formed along the cut edge of the color filter substrate 150 between the cut end of the color filter substrate 150 and the TFT substrate 110.

At this time, the short-circuit prevention seal 160 may be formed so as to cover the cut color filter substrate 150 and at least one horizontal pixel line 113 on the TFT substrate 110 closest to the cut end of the color filter substrate 150.

A hardenable resin may be applied to a portion at which the short-circuit prevention seal 160 is to be formed, and may then be hardened in order to form the short-circuit prevention seal 160.

Here, the hardenable resin may be a naturally hardenable resin or a thermosetting resin. However, an ultraviolet (UV)-curable resin, which is hardened by ultraviolet rays, may be used as the hardenable resin in order to minimize damage to the pixels due to heat.

As shown in FIG. 5, after the short-circuit prevention seal 160 is formed at the stretched display panel 100, an cutoff line 170 is formed along a corresponding one of the horizontal pixel lines 113 in order to electrically cut off the horizontal pixel line 113 that is covered by the short-circuit prevention seal 160 and the horizontal pixel lines 113 that are not covered by the short-circuit prevention seal 160 from each other.

Here, the cutoff line 170 electrically cuts off the horizontal pixel lines 113 from each other in order to prevent noise from being generated in the horizontal pixel lines 113 that are not covered by the short-circuit prevention seal 160 due to conductive foreign matter.

The cutoff line 170 may be formed between the horizontal pixel line 113 that is covered by the short-circuit prevention seal 160 and the horizontal pixel line 113 that is not covered by the short-circuit prevention seal 160. Alternatively, the cutoff line 170 may be formed by forming a notch in one of the horizontal pixel lines 113 that are not covered by the short-circuit prevention seal 160 or by removing one of the horizontal pixel lines 113 that are not covered by the short-circuit prevention seal 160.

Meanwhile, a laser may be applied to the horizontal pixel line 113 in order to remove the horizontal pixel line 113 through incineration.

In the case in which the horizontal pixel line 113 is removed through incineration using a laser, it is possible to prevent conductive foreign matter from being separated from the horizontal pixel line 113 at the time of removing the horizontal pixel line 113.

As shown in FIG. 6, after the cutoff line 170 is formed between the horizontal pixel lines 113, a reinforcement seal 180 is formed at the upper part of the pixel exposure portion 111 in order to increase the rigidity of the pixel exposure portion 111.

The reinforcement seal 180 may be formed so as to entirely cover the horizontal pixel line 113 that is exposed outwards and the upper part of the pixel exposure portion 111 as well as the upper part of the short-circuit prevention seal 160.

Meanwhile, a hardenable resin may be applied and hardened in order to form the reinforcement seal 180, whereby it is possible to minimize damage to the color filter substrate and the TFT substrate 110 due to heat.

Here, hardening is performed differently depending on the kind of hardenable resin. As examples thereof, a natural hardenable resin is left at a normal temperature for a predetermined amount of time, a thermosetting resin is thermally treated, and ultraviolet rays are applied to a UV-curable resin.

After the reinforcement seal 180 is formed at the stretched display panel 100, as described above, a final inspection is carried out.

The final inspection is carried out in the same manner as the preliminary inspection. The stretched display panel 100 is powered on in order to drive the stretched display panel 100, and then noise is detected from the stretched display panel 100.

In the case in which noise is generated at the final inspection, the reinforcement seal 180 and the short-circuit prevention seal 160 may be removed, and then foreign matter may be removed by washing. Alternatively, the cutoff line 170 may be formed again, the short-circuit prevention seal 160 and the reinforcement seal 180 may be formed again, and the inspection may be carried out again.

After passing the final inspection, the manufacture of the stretched display panel 100 according to the embodiment of the present invention is completed. The manufactured stretched display panel 100 may be delivered as it is, or may be installed at a place at which the stretched display panel 100 is to be installed in order to use the stretched display panel 100.

In addition, the method of manufacturing the stretched display panel 100 according to the embodiment of the present invention may be used in order to restore an existing stretched display panel 100 that is classified as a defective panel due to noise generated therein.

As shown in FIG. 7, the stretched display panel 100, manufactured using the method of manufacturing the stretched display panel 100, as described above, is configured to have a structure in which the TFT substrate 110 protrudes further than the color filter substrate 150 such that the horizontal pixel lines 113 are exposed and in which the short-circuit prevention seal 160 is formed at the cut end of the horizontal pixel lines 113 so as to cover at least one horizontal pixel line 113.

In addition, the stretched display panel 100 is configured to have a structure in which the cutoff line 170 is formed between the horizontal pixel line 113 that is covered by the short-circuit prevention seal 160 and the horizontal pixel line 113 that is not covered by the short-circuit prevention seal 160 and in which, finally, the entire pixel exposure portion 111 is covered by the reinforcement seal 180.

In the stretched display panel 100, manufactured using the method of manufacturing the stretched display panel 100 according to the embodiment of the present invention, it is possible to minimize the amount of noise generated in the stretched display panel 100 due to foreign matter, whereby it is possible to considerably reduce the defect rate of the stretched display panel 100.

In addition, it is possible to restore an existing stretched display panel 100 that is determined to be a defective panel due to noise generated therein, whereby it is possible to minimize financial loss due to discarding the same.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applicable to various display fields for displaying images, such as a game machine, a computer, and a signboard.

The invention claimed is:

1. A method of manufacturing a stretched display panel by cutting a ready-made display panel comprising a color filter substrate and a thin film transistor (TFT) substrate to a desired size, the method comprising:
    cutting the TFT substrate to a desired size;
    cutting the color filter substrate so as to have a length smaller than a length of the TFT substrate such that a pixel exposure portion, from which one or more horizontal pixel lines are exposed, is formed at the TFT substrate;
    forming a short-circuit prevention seal for covering one of the horizontal pixel lines that is adjacent to an end of the color filter substrate in order to prevent occurrence of a short circuit due to introduction of foreign matter; and
    forming an cutoff line for cutting off the horizontal pixel line(s) that is not covered by the short-circuit prevention seal and the horizontal pixel line that is covered by the short-circuit prevention seal from each other.

2. The method according to claim 1, further comprising forming a reinforcement seal for entirely covering the pixel exposure portion of the TFT substrate, from which the horizontal pixel lines are exposed, in order to increase a rigidity of the pixel exposure portion.

3. The method according to claim 1, wherein the step of forming the short-circuit prevention seal comprises:
    applying a hardenable resin so as to cover one of the horizontal pixel lines exposed from the pixel exposure portion that is adjacent to a cut end of the color filter substrate; and
    performing hardening treatment in order to harden the hardenable resin.

4. The method according to claim 1, wherein the cutoff line is formed through incineration using a laser.

5. The method according to claim 1, further comprising supplying electric power to the display panel in order to inspect whether noise is generated from the display panel (a preliminary inspection step), the preliminary inspection step being performed between the step of cutting the color filter substrate so as to have a length smaller than the length of the TFT substrate and the step of forming the short-circuit prevention seal.

6. The method according to claim 1, further comprising supplying electric power to the display panel in order to inspect whether noise is generated from the display panel (a final inspection step), the final inspection step being performed after the step of forming the cutoff line.

7. A stretched display panel manufactured using a method of manufacturing a stretched display panel according to claim 1.

8. A stretched display panel manufactured by cutting a ready-made display panel comprising a color filter substrate and a TFT substrate to a desired size, the stretched display panel comprising:
    a pixel exposure portion extending from the TFT substrate so as to be longer than a cut end of the color filter substrate in order to expose one or more horizontal pixel lines;
    a short-circuit prevention seal for covering one of the horizontal pixel lines that is adjacent to the cut end of the color filter substrate, among the horizontal pixel lines exposed through the pixel exposure portion, in order to prevent occurrence of a short circuit due to foreign matter; and
    an cutoff line for cutting off the horizontal pixel line(s) that is not covered by the short-circuit prevention seal and the horizontal pixel line that is covered by the short-circuit prevention seal from each other.

9. The stretched display panel according to claim 8, further comprising a reinforcement seal for entirely covering the pixel exposure portion of the TFT substrate, from which the horizontal pixel lines are exposed, in order to increase a rigidity of the pixel exposure portion.

10. The stretched display panel according to claim 8, wherein the short-circuit prevention seal is a hardenable resin configured to be hardened through hardening treatment.

11. The stretched display panel according to claim 8, wherein the cutoff line is formed through incineration using a laser.

* * * * *